United States Patent [19]

Narr et al.

[11] 3,888,851
[45] June 10, 1975

[54] 2,4-DIAMINO-SUBSTITUTED THIENO(3,2-D)PYRIMIDINES AND SALTS THEREOF

[75] Inventors: Berthold Narr; Josef Roch; Erich Müller; Josef Nickl, all of Biberach an der Riss, Germany

[73] Assignee: Boehringer Ingelheim GmbH, Ingelheim am Rhein, Germany

[22] Filed: May 3, 1972

[21] Appl. No.: 249,782

[30] Foreign Application Priority Data

May 4, 1971    Germany............................ 2121950
    July 26, 1971    Germany............................ 2137431
    Mar. 29, 1972    Germany............................ 2215299

[52] U.S. Cl. ....... 260/243 R; 260/243 B; 260/247.1; 260/251 A; 260/256.5 R; 424/246; 424/248; 424/251
[51] Int. Cl. ............................................. C07d 99/10
[58] Field of Search ...... 260/256.5 R, 243 B, 243 R

[56] References Cited
UNITED STATES PATENTS

| | | | |
|---|---|---|---|
| 3,210,368 | 10/1965 | Huebner............................ | 260/306.8 |
| 3,259,623 | 7/1966 | Kober................................ | 260/247.5 |
| 3,475,429 | 10/1969 | Woitun.............................. | 260/247.1 |

FOREIGN PATENTS OR APPLICATIONS

| | | | |
|---|---|---|---|
| 1,057,612 | 2/1967 | United Kingdom.............. | 260/247.1 |

OTHER PUBLICATIONS

Narr, et al. Chemical Abstract 77:88539f (1972).
Narr, et al. Chemical Abstract 78:124620g (1973).
Narr, et al. Chemical Abstract 78:72184w (1973).
Thomae, "Dihydrothieno [3,2-d]pyrimidines," Chemical Abstract 64:8203a–8204a (1966).
Thomae, "Thienopyrimidines", Chem. Abstr. 67:100149 (1967).
Woitun, et al. Chemical Abstract 74:125725z (1971).
Narr, et al. Chemical Abstract 77:88539f (1972).
Woitun, et al. Chemical Abstract 77:88540z(1972).
Woitun, et al. Chemical Abstract 75:110329v(1971).

*Primary Examiner*—R. Gallagher
*Attorney, Agent, or Firm*—Hammond & Littell

[57] ABSTRACT

Compounds of the formula

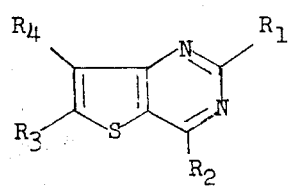

wherein:
$R_1$ and $R_2$, which may be identical to or different from each other, are each
  a. heterocyclic amino selected from the group consisting of piperazino, N'-benzyl-piperazino, N'-lower alkyl piperazino, N'-(hydroxylower alkyl)-piperazino, 1,4-diazacyclo-heptano, morpholino, thiomorpholino, 1-oxidothiomorpholino, 1,1-dioxide-thiomorpholino, hexahydro-1,4-thiazepino and 1-oxido-hexahydro-1,4-thioazepino, where each of these heterocycles may optionally have one or two lower alkyl substituents attached to ring carbon atoms; or
  b. acyclic amino selected from the group consisting of di-lower alkanol-amino, N-(methylmercapto-ethyl)-methylamino and N-(methylsulfinyl-ethyl)-methylamino; and
$R_3$ and $R_4$, which may be identical to or different from each other, are each hydrogen, halogen, lower alkyl, phenyl or nitro,
and their non-toxic, pharmacologically acceptable acid addition salts; the compounds as well as their salts are useful as inhibitors of thrombocyte aggregation and adhesiveness, and those were $R_1$ and/or $R_2$ is 1-oxide-thiomorpholino are also useful as hypotensives.

9 Claims, No Drawings

2,4-DIAMINO-SUBSTITUTED THIENO(3,2-D)PYRIMIDINES AND SALTS THEREOF

This invention relates to novel 2,4-diamino-substituted thieno[3,2-d]pyrimidines and acid addition salts thereof, as well as to methods of preparing these compounds.

More particularly, the present invention relates to a novel class of thieno[3,2-d]pyrimidines represented by the formula

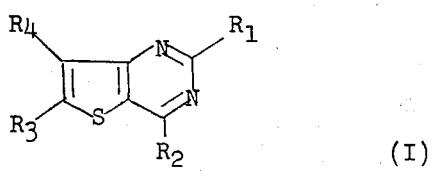

wherein: $R_1$ and $R_2$, which may be identical to or different from each other, are each a. heterocyclic amino selected from the group consisting of piperazino, N'-benzyl-piperazino, N'-lower alkyl-piperazino, N'-(hydroxy-lower-alkyl)-piperazino, 1,4-diazacyclo-heptano, morpholino, thiomorpholino, 1-oxidothiomorpholino, 1,1-dioxido-thiomorpholino, hexahydro-1,4-thiazepino and 1-oxido-hexahydro-1,4-thiazepino, where each of these heterocycles may optionally have one or two lower alkyl substituents attached to ring carbon atoms; or b. acyclic amino selected from the group consisting of di-lower alkanol-amino, N-(methylmercapto-ethyl)-methylamino and N-(methylsulfinyl-ethyl)-methylamino; and $R_3$ and $R_4$, which may be identical to or different from each other, are each hydrogen, halogen, lower alkyl, phenyl or nitro, and their non-toxic, pharmacologically acceptable acid addition salts.

The compounds embraced by formula I may be prepared by reacting a thieno[3,2-d]pyrimidine of the formula

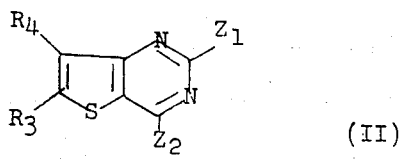

wherein;
$R_3$ and $R_4$ have the same meanings as in formula I,
one of $Z_1$ and $Z_2$ is an exchangeable substituent, such as halogen, mercapto, lower alkyl-mercapto, aryl-mercapto, aralkyl-mercapto, lower alkyl-sulfinyl, aryl-sulfinyl, aralkyl-sulfinyl, lower alkyl-sulfonyl, aryl-sulfonyl or aralkyl-sulfonyl, and
the other of $Z_1$ and $Z_2$ has a meaning defined for $R_1$ and $R_2$ in formula I,
with an amine of the formula

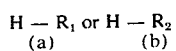

wherein $R_1$ and $R_2$ have the same meanings as in formula I.

Depending upon the reactivity of the exchangeable substituent $Z_1$ or $Z_2$, the reaction is carried out at a temperature between 0° and 250°C, optionally in the presence of an acid binding agent, and advantageously in a solvent medium, such as dioxane, glycol dimethyl ether, dimethylsulfoxide, ethanol or a sufficient excess of the amine reactant of the formula III (a) or (b) over and above the stoichiometrically required amount.

More particularly, if $Z_1$ is halogen or lower alkyl-, aryl or aralkyl-substituted sulfinyl or sulfonyl, the reaction is preferably performed at a temperature between 100° and 150°C; on the other hand, if $Z_1$ is mercapto or lower alkyl-, aryl- or aralkyl-substituted mercapto, the reaction is preferably carried out in a pressure vessel at a temperature of 150° to 200°C.

If $Z_2$ is halogen, the reaction is preferably performed at a temperature between 0° and 40°C, but if $Z_2$ is mercapto or lower alkyl-, aryl- or aralkyl-substituted mercapto, sulfinyl or sulfonyl, it is preferably performed at a temperature between 100° and 200°C.

In order to prepare a compound of the formula I wherein $R_1$ and $R_2$ are identical, the starting compound may also be one of the formula II wherein $Z_1$ and $Z_2$ are both exchangeable substituents of the type defined in connection with formula II, and the reaction then proceeds stepwise. For example, if the starting compound is a 2,4-dichloro-substituted thieno[3,2-d]pyrimidine of the formula II, the chlorine atom in the 4-position is exchanged for the amino-substituent at a temperature between 0° and 40°C, while the chlorine atom in the 2-position is not exchanged until more elevated temperatures are applied.

For the preparation of a compound of the formula I wherein $R_1$ and/or $R_2$ is an N'-unsubstituted piperazino or 1,4-diazacycloheptano group, it is of further advantage if the imino group in the starting compound of the formula II and/or one imino group in the piperazine or 1,4-diazacycloheptane reactant is protected during the reaction by a conventional acyl protective group, such as carbethoxy, formyl, acetyl or benzoyl. This protective group can subsequently be split off again, for instance by hydrolysis in the presence of an acid or a base at temperatures up to the boiling point of the solvent medium. In the case of S-oxide compounds, however, the removal of the acyl protective group is preferably effected by hydrolysis in the presence of a base, such as potassium hydroxide.

The starting compounds of the formula II required for this method may be prepared by processes described in the literature; see, for example, German Offenlegungsschrift No. 1,470,356 and U.S. Pat. No. 3,475,429.

Thus, by reacting a 2,4-dichloro-thieno[3,2-d]pyrimidine with an amine at relatively low temperatures, such as between 0° and 40°C, a corresponding 2-chloro-4-amino-thieno [3,2-d]pyrimidine of the formula II is obtained.

Mild hydrolysis of a 2,4-dichloro-thieno[3,2-d]pyrimidine with one molar equivalent of an alkali metal hydroxide at lower temperatures yields the corresponding 2-chloro-4-hydroxy-thieno[3,2-d]pyrimidine, which is subsequently reacted at more elevated temperatures with an amine to yield the corresponding 2-amino-4-hydroxy-thieno[3,2-d]pyrimidine which, in turn, is coverted into the corresponding 2-amino-4- halo-thieno[3,2-d]pyrimidine of the formula II by conventional methods.

A 2- or 4-halo-substituted thieno[3,2-d]pyrimidine of the formula II may be converted with a corresponding mercapto or hydroxy compound in the presence of a strong base into the analogous 2- or 4-mercapto- or hydroxy-substituted thieno[3,2-d]pyrimidine of the formula II. A 2- or 4-mercapto-substituted thieno[3,2-d]pyrimidine thus obtained may then be converted by oxidation into the analogous sulfinylor sulfonyl-substituted thieno[3,2-d]pyrimidine of the formula II.

The starting compounds of the formula II wherein $R_3$ and/or $R_4$ are halogen or nitro may be prepared by halogenation or nitration, respectively, of 2,4-dihydroxy-thieno[3,2-d]pyrimidine, conversion of the reaction production into the corresponding 2,4-diahalo-thieno[3,2-d]pyrimidine, followed by reaction of the latter with an amine at relatively low temperatures, such as between 0° and 40°C.

The compounds embraced by formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, lactic acid, citric acid, tartaric acid, maleic acid, 8-chlorotheophylline or the like.

The following examples further illustrate the present invention and will enable others skilled in the art to understand it more completely. It should be understood, however, that the invention is not limited solely to the particular examples given below.

PREPARATION OF STARTING COMPOUNDS OF THE FORMULA II:

EXAMPLE A

7-Bromo-2,4-dichloro-thieno[3,2-d]pyrimidine 90 gm (0.54 mol) of 2,4-dihydroxy-thieno[3,2-d]pyrimidine (prepared from methyl 3-aminothiophene-2-carboxylate and urea) were suspended in 2.5 liters of glacial acetic acid, the suspension was heated to 80°C, and then, while stirring, 275 gm (1.72 mols) of bromine were added dropwise to the hot suspension. The resulting mixture was stirred for 2 hours more at 80°C, subsequently concentrated to 500 ml in vacuo and then poured into about 2 liters of water. The crystalline 7-bromo-2,4-dihydroxy-thieno[3,2-d]pyrimidine precipitated thereby was collected by vacuum filtration and dried at 100°C in vacuo. Yield of raw product: 85 gm.

70 gm (0.282 mol) of raw 7-bromo-2,4-dihydroxy-thieno[3,2-d]pyrimidine were introduced into a mixture consisting of 600 ml of phosphorus oxychloride and 80 ml of pyridine; the temperature of the mixture rose to about 60°C and it turned dark while substantially all of the thienopyrimidine went into solution. In order to cause the reaction to go to completion, the mixture was refluxed for 2 hours. Thereafter, the excess unreacted phosphorus oxychloride was distilled off in vacuo, and the residue was carefully stirred into ice water. The aqueous phase was extracted with chloroform, the organic extract solution was dried with anhydrous sodium carbonate, the chloroform was evaporated in vacuo, and the crystalline residue was recrystallized twice from ethanol/dioxane in the presence of activated charcoal, yielding 40 gm (50% of theory) of 7-bromo-2,4-dichloro-thieno[3,2-d]pyrimidine, m.p. 177.5°–178.5°C.

| Analysis: | $C_6H Br Cl_2N_2S$; | mol.wt. 284.0 |
|---|---|---|
| Calculated: | C-25.40%; H-0.36%; | Br-28.18%; N-9.88%; S-11.30% |
| Found: | C-25.80%; H-0.52%; | Br-27.90%; N-9.86%; S-11.35% |

EXAMPLE B 2,4,6- and 2,4,7-trichloro-thieno[3,2-d]pyrimidine 200 gm (1.19 mol) of 2,4-dihydroxy-thieno[3,2-d]pyrimidine were suspended in 3 liters of glacial acetic acid, and the suspension was heated to reflux. 120 gm (1.7 mols) of chlorine were introduced over a period of 5 hours into the refluxing suspension, whereby the thienopyrimidine went into solution, and the mixture turned brown. Thereafter, the reaction mixture was concentrated by evaporation in vacuo to 1 liter and then admixed with 2 kg of ice. The crystalline precipitate formed thereby, consisting of an isomeric mixture of 6-chloro- and 7-chloro-2,4-dihydroxy-thieno[3,2-d]pyrimidine, was collected by vacuum filtration, washed with acetone and dried at 100°C in vacuo. Yield of raw product: 160 gm.

The raw isomeric mixture thus obtained was suspended in 1.4 liters of phosphorus oxychloride, and the suspension was refluxed for 8 hours, whereby a clear, dark solution was formed. The reaction solution was concentrated by evaporation in vacuo to about 400 ml and then carefully stirred into 2 liters of ice water. The aqueous phase was extracted five times with 500 ml of chloroform each, and the combined chloroform extracts were de-colorized by treatment with activated charcoal, dried over sodium sulfate and evaporated to dryness. The residue (150 gm) was separated into its components by column chromatography on silicagel (particle size 0.05–0.2 mm; flow agent: Hexane/methylene chloride = 1:3). The eluate contained first a small amount of 2,4,6,7-tetrachloro-thieno[3,2-d]pyrimidine, then a fraction of 2,4,6-trichloro-thieno[3,2-d]pyrimidine and finally a fraction of 2,4,7-trichloro-thieno[3,2-d]pyrimidine. The uniform fractions were evaporated to dryness, and the residue was recrystallized, yielding:

a. 1.6 gm of 2,4,6,7-tetrachloro-thieno[3,2-d]pyrimidine, m.p. 118°–120°C.

| Analysis: | $C_6Cl_4N_2S$; | mol.wt. 273.94 |
|---|---|---|
| Calculate: | C-26.32%; | H-0.00%; N-10.22% |
| Found: | C-26.25%; | H-0.17%; N-10.27% | b. 70 gm (24.6% of theory) of 2,4,6-trichloro-thieno[3,2-d]pyrimidine, m.p. 144°C (from ethanol).

| Analysis: | $C_6H_1Cl_3N_2S$; | mol.wt. 239.53 |
|---|---|---|
| Calculated: | C-30.50%; | H-0.42%; N-11.72%; S-13.40% |
| Found: | C-29.55%; | H-0.32%; N-12.14%; S-13.61% | c. 40 gm (14.1% of theory) of 2,4,7-trichloro-thieno[3,2-d]pyrimidine, m.p. 177.5–178.5°C (form isopropanol).

| Analysis: | $C_6H_1Cl_3N_2S$; | mol.wt. 239.53 |
|---|---|---|
| Calculated: | C-30.05%; | H-0.42%; N-11.72% |
| Found: | C-30.10%; | H-0.39%; N-11.94%. |

EXAMPLE C 2,4-Dichloro-6-nitro- and
2,4-dichloro-7-nitro-thieno[3,2-d]pyrimidine 142.5 gm (0.85 mol) of 2,4-dihydroxy-thieno[3,2-d]pyrimidine were gradually introduced over a period of one hour into a mixture of 400 ml of concentrated sulfuric acid and 400 ml of fuming nitric acid at −5° to −2°C, accompanied by stirring. After a clear solution has been formed it was poured over ice, and the crystalline precipitate formed thereby, consisting of an isomeric mixture of 2,4-dihydroxy-6-nitro- and 2,4-dihydroxy-7-nitro-thieno[3,2-d]pyrimidine, was collected by vacuum filtration, washed with water until neutral and dried in vacuo. Yield of raw product: 112 gm.

The raw isomeric mixture was added to a mixture of 500 ml of phosphorus oxychloride and 75 ml of pyridine, and the mixture was refluxed until a clear, reddish-brown solution hand formed, which required about four hours. Thereafter, the excess unreacted phosphorus oxychloride was evaporated in vacuo, and the residue was carefully poured over ice. The light brown precipitate formed thereby was collected by vacuum filtration, washed with water until neutral, dried in vacuo and separated into its components by column chromatography on silicagel (particle size: 0.2 – 0.5 mm; flow agent: Hexane/ethyl acetate = 5:1). The eluate yielded two successive uniform fractions, each of which was evaporated to dryness. Recrystallization of the residues yielded a. 21 gm (16% of theory) of 2,4-dichloro-6-nitro-thieno [3,2-d]pyrimidine, m.p. 171°C (from isopropanol).

| Analysis: | $C_6H_1Cl_2N_3O_2S$; | mol.wt. 250.08 |
|---|---|---|
| Calculated: | C-28.80%; H-0.40%; | Cl-28.37%; N-16.80%; S-12.82% |
| Found: | C-29.00%; H-0.49%; | Cl-28.70%; N-16.57%; S-12.70% | b. 19.5 gm (14.8% of theory) of 2,4-dichloro-7-nitrothieno[3,2-d]pyrimidine, m.p. 205°C (from ethanol/ethyl acetate).

| Analysis: | $C_6H_1Cl_2N_3O_2S$; | mol.wt. 250.08 |
|---|---|---|
| Calculated: | C-28.80%; H-0.40%; | N-16.80%; S-12.82% |
| Found: | C-28.90%; H-0.59%; | N-17.17%; S-12.78% |

EXAMPLE D

2-Chloro-4-morpholino-6-nitro-thieno[3,2-d]pyrimidine

A mixture consisting of 2.5 gm (0.01 mol) of 2,4-dichloro-6-nitro-thieno[3,2-d]pyrimidine, 2.6 gm (0.03 mol) of morpholine and 100 ml of ethanol was stirred for 5 hours at room temperature and thereafter admixed with double volume of water. The yellow crystalline precipitate formed thereby was colled by vacuum filtration, washed with water and recrystallized from ethanol/dioxane, yielding 2.5 gm (83.0% of theory) of 2-chloro-4-morpholino-thieno[3,2-d]pyrimidine, m.p. 272°C.

| Analysis: | $C_{10}H_9ClN_4O_3S$; | mol.wt. 300.74 |
|---|---|---|
| Calculated: | C-39.95%; H-3.02%; | Cl-11.78%; N-18.63%; S-10.66% |
| Found: | C-40.05%; H-2.94%; | Cl-11.95%; N-18.47%; S-10.42% |

Preparation of end products of the formula I:

EXAMPLE 1

7-Bromo-2-piperazino-4-(thiomorpholino-1'-oxide)-thieno[3,2-d]pyrimidine and its hydrochloride 6 gm (0.016 mol) of 7-bromo-2-chloro-4-(thiomorpholino-1'-oxide)-thieno[3,2-d]pyridine (m.p. 215°C) were stirred into 10 gm of molten anhydrous piperazine at 140°C, and the mixture was maintained at 140°C for 15 minutes more. Thereafter, the reaction mixture was allowed to cool and was then poured into water. The resulting aqueous mixture was extracted with chloroform, the chloroform extract solution was dried over sodium sulfate and then evaporated to dryness, and the residue was recrystallized twice from isopropanol, yielding 5 gm (73.5% of theory) of the compound of the formula

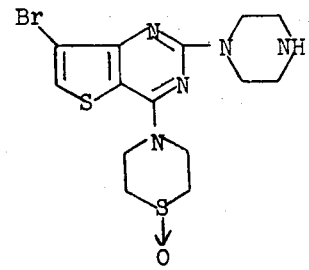

which had a melting point of 229°C.

| Analysis: | $C_{14}H_{18}BrN_5OS_2$; | mol.wt. 416.37 |
|---|---|---|
| Calculated: | C-40.40%; H-4.36%; | Br-19.20%; S-15.40% |
| Found: | C-40.45%; H-4.34%; | Br-19.23%; S-15.21% |

The free base thus obtained was dissolved in a sufficient amount of ethanol, the resulting solution was acidified with ethanolic hydrochloric acid, and ether was added to the acid solution. The precipitate formed thereby was collected and recrystallized from isopropanol/water, yielding the hydrochloride monohydrate of the base, m.p. 256°–258°C.

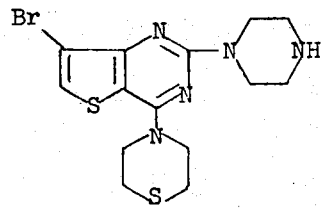

| Analysis: | $C_{14}H_{18}Br\ N_5OS_2$ | $HCl\ .\ H_2O$; mol.wt. 470.86 |
|---|---|---|
| Calculated: | C-35.71%; H-4.50%; | N-14.87%; Cl-7.53%; Br-16.97% |
| Found: | C-36.02%; H-4.32%; | N-14.85%; Cl-7.55%; Br-17.20% |

EXAMPLE 2

Using a procedure analogous to that described in Example 1, 7-bromo-2-piperazino-4-morpholino-thieno[3,2-d] pyrimidine, m.p. 184°–185°C, of the formula

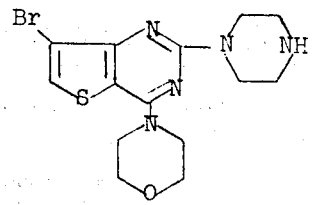

was prepared from 7-bromo-2-chloro-4-morpholino-thieno[3,2-d] pyrimidine (m.p. 212°C) and piperazine.

EXAMPLE 3

Using a procedure analogous to that described in Example 1, 7-bromo-2-diethanolamino-4-(thiomorpholino-1'-oxide)-thieno[3,2-d]pyrimidine, m.p. 210°–211°C (from dioxane), of the formula

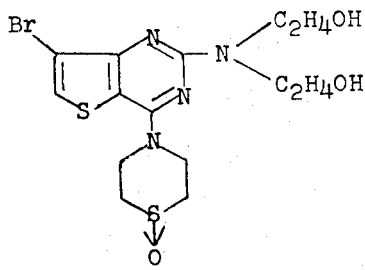

was prepared from 7-bromo-2-chloro-4-(thiomorpholino-1'-oxide)-thieno[3,2-d]pyrimidine (m.p. 215°C) and diethanolamine.

EXAMPLE 4

Using a procedure analogous to that described in Example 1, 7-bromo-2-piperazino-4-thiomorpholino-thieno[3,2-d]pyrimidine of the formula was prepared from 7-bromo-2-chloro-4-thiomorpholino-thieno[3,2-d]pyrimidine (m.p. 189°–190°C) and piperazine.

Its hydrochloride monohydrate had a melting point of 296°–297°C (from isopropanol/water).

EXAMPLE 5

Using a procedure analogous to that described in Example 1, 7-bromo-2-piperazino-4-(thiomorpholino-1', 1'-dioxide)-thieno[3,2-d]pyrimidine of the formula

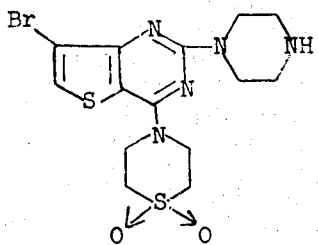

was prepared from 7-bromo-2-chloro-4-(thiomorpholino-1', 1'-dioxide)-thieno[3,2-d]pyrimidine (m.p 298°C) and piperazine.

Its hydrochloride had a melting point of 299°–301°C (from ethanol/water).

EXAMPLE 6

Using a procedure analogous to that described in Example 1, 7-chloro-2-piperazino-4-morpholino-thieno[3,2-d]pyrimidine of the formula

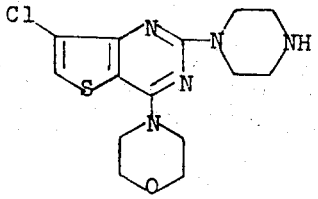

was prepared from 2,7-dichloro-4-morpholino-thieno[3,2-d]pyrimidine (m.p. 186°–187°C) and piperazine.

Its dihydrochloride monohydrate had a melting point of 256°C (decomp.; from ethanol/water).

EXAMPLE 7

Using a procedure analogous to that described in Example 1, 7-chloro-2-piperazino-4-(thiomorpholino-1'- oxide)-thieno[3,2-d]pyrimidine, m.p. 245°–246.5°C (from xylene), of the formula

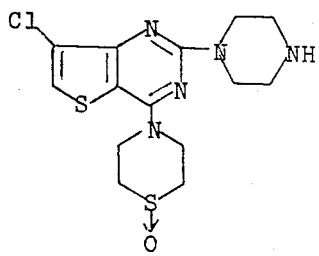

was prepared from 2,7-dichloro-4-(thiomorpholino-1'-oxide)-thieno[3,2-d]pyrimidine (m.p. 244°–245°C) and piperazine.

EXAMPLE 8

Using a procedure analogous to that described in Example 1, 7-chloro-2-piperazino-4-thiomorpholino-thieno[3,2-d]pyrimidine of the formula

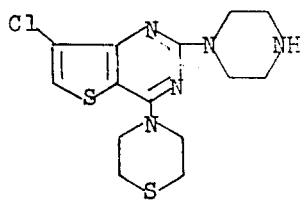

was prepared from 2,7-dichloro-4-thiomorpholino-thieno[3,2-d]pyrimidine (m.p. 179°C) and piperazine.

Its hydrochloride dihydrate had a melting point of 288°C (decomp.; from ethanol/water).

EXAMPLE 9

Using a procedure analogous to that described in Example 1, 7-chloro-2-piperazino-4-(thiomorpholino-1',1'-dioxide)-thieno[3,2-d]pyrimidine of the formula

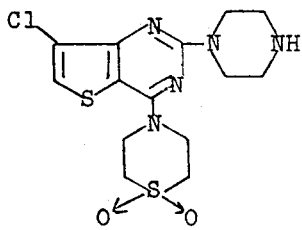

was prepared from 2,7-dichloro-4-(thiomorpholino-1',1'-dioxide)-thieno[3,2-d]pyrimidine (m.p. 312°–313°C) and piperazine.

Its hydrochloride trihydrate had a melting point of 281°C (decomp.; from ethanol/water).

EXAMPLE 10

Using a procedure analogous to that described in Example 1, 7-chloro-2-diethanolamino-4-(thiomorpholino-1'-oxide)-thieno[3,2-d]pyrimidine, m.p. 179°–180°C, of the formula

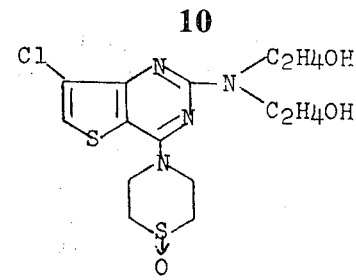

was prepared from 2,7-dichloro-4-(thiomorpholino-1'-oxide)-thieno[3,2-d]pyrimidine (m.p. 244°–245°C) and diethanolamine.

EXAMPLE 11

Using a procedure analogous to that described in Example 1, 6,7-dichloro-2-piperazino-4-(thiomorpholino-1'-oxide)-thieno[3,2-d]pyrimidine, m.p. 230°–232°C (from isopropanol), of the formula

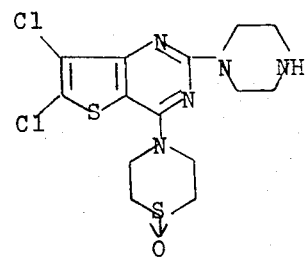

was prepared from 2,6,7-trichloro-4-(thiomorpholino-1'-oxide)-thieno[3,2-d]pyrimidine (m.p. 207°–209°C) and piperazine.

EXAMPLE 12

Using a procedure analogous to that described in Example 1, 7-chloro-2-(N'-methyl-piperazino)-4-(thiomorpholino-1'-oxide)-thieno[3,2-d]pyrimidine, m.p. 140°C (from isopropanol), of the formula

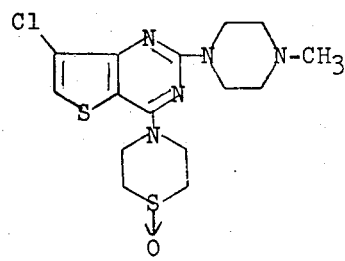

was prepared from 2,7-dichloro-4-(thiomorpholino-1'-oxide)-thieno[3,2-d]pyrimidine (m.p. 244°–245°C) and N-methyl-piperazine.

EXAMPLE 13

4-Morpholino-7-nitro-2-piperazino-thieno[3,2-d]pyrimidine

A solution of 2.26 gm (0.0075 mol) of 2-chloro-4-morpholino-7-nitro-thieno[3,2-d]pyrimidine (m.p. 208°C) and 6.5 gm (0.075 mol) of anhydrous piperazine in 50 ml of dioxane was refluxed for 30 minutes. Thereafter, the dark orange reaction mixture was allowed to cool, taken up in methylene chloride, washed three times with water, dried over sodium sulfate and filtered through activated charcoal. The filtrate was evaporated, and the residual crystalline substance was recrystallized from isopropanol, yielding 2.0 gm (76% of theory) of the compound of the formula

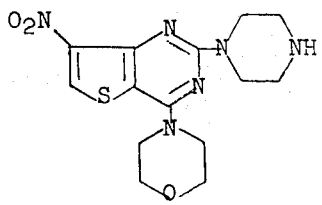

which had a melting point of 202°–205°C.

| Analysis: | C₁₄H₁₈N₆O₃S; | mol.wt. 350.41 | |
|---|---|---|---|
| Calculated: | C-48.00%; | H-5.17%; | N-24.00%; S-9.14% |
| Found: | C-47.90%; | H-5.14%; | N-23.70%; S-9.22% |

EXAMPLE 14

Using a procedure analogous to that described in Example 13, 2-piperazino-4-thiomorpholino-7-nitro-thieno[3,2-d]pyrimidine, m.p. of its hydrochloride 282°C (from ethanol/water), was prepared from 2-chloro-4-thiomorpholino-7-nitro-thieno[3,2-d]pyrimidine (m.p. 217°C) and piperazine; the reaction time was 3 hours.

EXAMPLE 15

Using a procedure analogous to that described in Example 13, 2-piperazino-4-(thiomorpholino-1′-oxide)-7-nitro-thieno[3,2-d]pyrimidine, m.p. of its hydrochloride semihydrate 245°C (decomp.), was prepared from 2-chloro-4-(thiomorpholino-1-oxide)-7-nitro-thieno[3,2-d]pyrimidine (m.p. 216°–218°C) and piperazine; the reaction time was 3 hours.

EXAMPLE 16

Using a procedure analogous to that described in Example 13, 2-piperazino-4-(thiomorpholino-1′,1′-dioxide)-7-nitro-thieno[3,2-d]pyrimidine, m.p. of its hydrochloride monohydrate >330°C (from ethanol/water), was prepared from 2-chloro-4-(thiomopholino-1,1-dioxide)-7-nitro-thieno[3,2-d]pyrimidine (m.p. 267°C) and piperazine; the reaction time was 2 hours.

EXAMPLE 17

Using a procedure analogous to that described in Example 13, 2-piperazino-4-morpholino-6-nitro-thieno[3,2-d]pyrimidine, m.p. 196°C (decomp.), was prepared from 2-chloro-4-morpholino-6-nitro-thieno[3,2-d]pyrimidine (m.p. 272°C) and piperazine; the reaction temperature was 70°C and the reaction time was 30 minutes.

EXAMPLE 18

Using a procedure analogous to that described in Example 13, 2-piperazino-4-thiomorpholino-6-nitro-thieno[3,2-d]pyrimidine, m.p. of its hydrochloride semihydrate >330°C from ethanol/water) was prepared from 2-chloro-4-thiomorpholino-6-nitro-thieno[3,2-d]pyrimidine (m.p. 222°C) and piperazine; the reaction temperature was 80°C and the reaction time 30 minutes.

EXAMPLE 19

Using a procedure analogous to that described in Example 13, 2-piperazino-4-(thiomorpholino-1′-oxide)-6-nitro-thieno[3,2-d]pyrimidine, m.p. of its hydrochloride monohydrate >330°C (from ethanol/water), was prepared from 2-chloro-4-(thiomorpholino-1′-oxide)-6-nitro-thieno[3,2-d]pyrimidine (m.p. 293°C, decomp.) and piperazine; the reaction temperature was 80°C and the reaction time 1 hour.

EXAMPLE 20

Using a procedure analogous to that described in Example 13, 2-piperazino-4-(thiomorpholino-1′,1′-dioxide)-6-nitro-thieno[3,2-d]pyrimidine, m.p. >300°C, was prepared from 2-chloro-4-(thiomorpholino-1′,1′-dioxide)-6-nitro-thieno[3,2-d]pyrimidine (m.p. 269°C) and piperazine; the reaction temperature was 60°C and the reaction time 30 minutes.

EXAMPLE 21

Using a procedure analogous to that described in Example 13, 2-piperazino-4-morpholino-6-chloro-thieno[3,2-d]pyrimidine, m.p. of its dihydrochloride semihydrate 195°C (decomp. from ethanol/water), was prepared from 2,6-dichloro-4-morpholino-thieno[3,2-d]pyrimidine (m.p. 169°C) and piperazine; the reaction mixture was refluxed for 3 hours.

EXAMPLE 22

Using a procedure analogous to that described in Example 13, 2-piperazino-4thiomorpholino-6-chloro-thieno[3,2-d]pyrimidine, m.p. of its dihydrochloride semihydrate 265°C (decomp. from ethanol/water), was prepared from 2,6-dichloro-4-thiomorpholino-thieno[3,2-d]pyrimidine (m.p. 165°C) and piperazine; the reaction mixture was refluxed for 3 hours.

EXAMPLE 23

Using a procedure analogous to that described in Example 13, 2-piperazino-4-thiomorpholino-1′,1′-dioxide)-6-chloro-thieno[3,2-d]pyrimidine, m.p. of its hydrochloride semihydrate 280°C (decomp.), was prepared from 2,6-dichloro-4-(thiomorpholino-1′,1′-dioxide)-thieno[3,2-d]pyrimidine (m.p. 237°–238°C) and piperazine; the reaction mixture was refluxed for 2 hours.

EXAMPLE 24

Using a procedure analogous to that described in Example 13, 2-piperazino-4-(thiomorpholino-1′-oxide)-6-chloro-thieno[3,2-d]pyrimidine, m.p. of its dihydrochloride monohydrate 208°C (decomp.), was prepared from 2,6-dichloro-4 -(thiomorpholino-1′-oxide)-thieno[3,2-d]pyrimidine (m.p. 263°C) and piperazine; the reaction mixture was refluxed for 3 hours.

EXAMPLE 25

2-Piperazino-4-(thiomorpholino-1′-oxide)-thieno[3,2-d]pyrimidine a. A mixture consisting of 10 gm (0.035 mol) of 2-chloro-4-(thiomorpholino-1′-oxide)-thieno[3,2-d]pyrimidine (m.p. 233°C) and 14 gm (0.088 mol) of N-carbethoxy-piperazine was heated for 20 minutes at 150°C, allowed to cool and then poured into ice water.

The precipitate formed thereby was collected by vacuum filtration, washed with water, dried and recrystallized from toluene, yielding 10.2 gm (73% of theory) of 2-(N'-carbethoxy-piperazino)-4-(thiomorpholino-1'-oxide)-thieno[3,2-d]pyrimidine, m.p. 197°–198°C.

| Analysis: | $C_{17}H_{23}N_5O_3S_2$; | mol.wt. 409.54 |
|---|---|---|
| Calculated: | C-49.97%; H-5.65%; | N-17.10%; S-15.63% |
| Found: | C-50.25%; H-5.60%; | N-17.05%; S-15.84% | b. A mixture consisting of 10.2 gm (0.025 mol) of the end product of (a), 12 gm (0.214 mol) of potassium hydroxide and 250 ml of isopropanol was refluxed for 10 hours. Thereafter, the isopropanol was substantially evaporated in vacuo, the residue was admixed with water, and the aqueous mixture was extracted with methylene chloride. The organic extract solution was washed with water, dried over sodium sulfate, and the methylene chloride was evaporated in vacuo. The residue was recrystallized from isopropanol, yielding 6.5 gm (78% of theory) of the compound of the formula

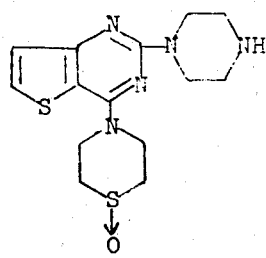

which had a melting point of 166°–168°C.

| Analysis: | $C_{14}H_{19}N_5OS_2$; | mol.wt. 337.46 |
|---|---|---|
| Calculated: | C-49.80%; | H-5.78%; N-20.74% |
| Found: | C-49.60%; | H-5.91%; N-20.70% |

EXAMPLE 26

Using a procedure analogous to that described in Example 25, 2-(thiomorpholino-1'-oxide)-4-piperazine-6-methyl-thieno[3,2-d]pyrimidine, m.p. 248°C (from ethanol/dioxane) of the formula

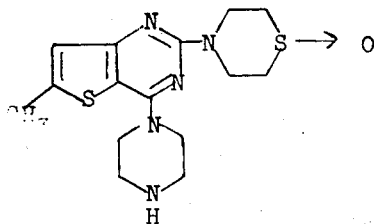

was prepared from 2-chloro-4-(N'-carbethoxy-piperazino)-6-methyl-thieno[3,2-d]pyrimidine (m.p. 167°C) and thiomorpholine-1-oxide, followed by hydrolysis of the intermediate 2-(thiomorpholino-1'-oxide)-4-(N'-carbethoxy-piperazino)-6-methyl-thieno[3,2-d]pyrimidine (m.p. 230°C).

EXAMPLE 27

Using a procedure analogous to that described in Example 25, 2-(thiomorpholino-1'-oxide)-4-piperazino-thieno[3,2-d]pyrimidine, m.p. 212°–213°C (from isopropanol) was prepared from 2-chloro-4-(N'-carbethoxy-piperazino)-thieno[3,2-d]pyrimidine (m.p. 145°–146°C) and thiomorpholine-1-oxide, followed by hydrolysis of the intermediate 2-(thiomorpholino-1'-oxide)-4-(N'-carbethoxy-piperazino)-thieno[3,2-d]pyrimidine (m.p. 196°–197°C).

EXAMPLE 28

Using a procedure analogous to that described in Example 25, 2-thiomorpholino-4-piperazino-thieno[3,2-d]pyrimidine, m.p. of its dihydrochloride monohydrate 294°C (decomp. from isopropanol/water), was prepared from 2-chloro-4-(N'-carbethoxy-piperazino)-thieno[3,2-d]pyrimidine (m.p. 145°–146°C) and thiomorpholine, followed by hydrolysis of the intermediate 2-thiomorpholine-4-(N'-carbethoxy-piperazino)-thieno[3,2-d]pyrimidine (m.p. 154°–155°C).

EXAMPLE 29

Using a procedure analogous to that described in Example 25, 2-(thiomorpholino-1', 1'-dioxide)-4-piperazino-thieno[3,2-d]pyrimidine, m.p. of its dihydrochloride 245° C (decomp.; from isopropanol/water), of the formula

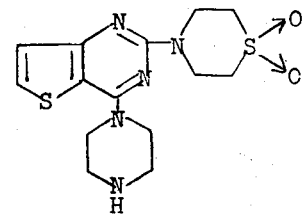

was prepared from 2-chloro-4-(N'-carbethoxy-piperazino)-thieno[3,2-d]pyrimidine (m.p. 145°–146°C) and thiomorpholine-1,1-dioxide, followed by hydrolysis of the intermediate 2-(thiomorpholino-1', 1'-dioxide)-4-(N'-carbethoxy-piperazino)-thieno[3,2-d]pyrimidine (m.p. 230°–231°C).

EXAMPLE 30

Using a procedure analogous to that described in Example 25, 2-(thiomorpholino-1'-oxide)-4-piperazino-7-methyl-thieno[3,2-d]pyrimidine, m.p. 204° C (from ethyl acetate/isopropanol) was prepared from 2-chloro-4-(N'-carbethoxy-piperazino)-7-methyl-thieno[3,2-d]pyrimidine (m.p. 117°C) and thiomorpholine-1-oxide, followed by hydrolysis of the intermediate 2-(thiomorpholino-1'-oxide)-4-(N'-carbethoxy-piperazino)-7-methyl-thieno[3,2-d]pyrimidine (m.p. 203°C).

EXAMPLE 31

Using a procedure analogous to that described in Example 25, 2-piperazino-4-(thiomorpholino-1'-oxide)-7-methyl-thieno[3,2-d]pyrimidine, m.p. of its dihydrochloride semihydrate 240°C, of the formula

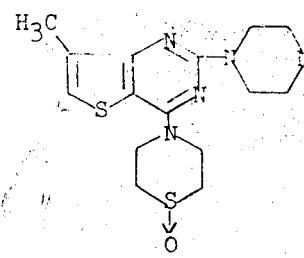

was prepared from 2-chloro-4-(thiomorpholino-1'-oxide)-7-methyl-thieno[3,2-d]pyrimidine (m.p. 239°C) and N-formyl-piperazine, followed by hydrolysis of the intermediate 2-(N'-formyl-piperazino)-4-(thiomorpholino-1'-oxide)-7-methyl-thieno[3,2-d]pyrimidine (m.p. 186°C).

The same compound was obtained when N-acetyl-piperazine was substituted for N-formyl-piperazine; the intermediate 2-(N'-acetyl-piperazino)-4-thiomorpholino-1'-oxide)-7-methyl-thieno[3,2-d]pyrimidine had a melting point of 214°-217°C.

The same compound was also obtained when N-benzoyl-piperazine was substituted for N-formyl-piperazine; the intermediate 2-(N'-benzoyl-piperazino)-4-(thiomorpholino-1'-oxide)-7-methyl-thieno[3,2-d]pyrimidine had a melting point of 211°-213°C.

EXAMPLE 32

Using a procedure analogous to that described in Example 25, 2-[N-(β-methylmercapto-ethyl)-methylamino]-4-piperazino-6-methyl-thieno[3,2-d]pyrimidine, m.p. 122°C (from isopropanol) of the formula

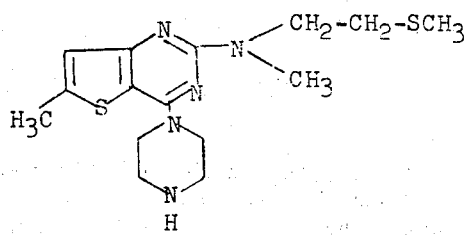

was prepared from 2-chloro-4-(N'-carbethoxy-piperazino)-6-methyl-thieno[3,2-d]pyrimidine (m.p. 167°C) and N-(β-methyl-mercapto-ethyl)-methylamine, followed by hydrolysis of the intermediate 2-[N-(β-methylmercapto-ethyl)-methylamino[-4-(N'-carbethoxy-piperazino)-6-methyl-thieno[3,2-d]pyrimidine (m.p. 105°-107°C).

EXAMPLE 33

Using a procedure analogous to that described in Example 25, 2-[N-(β-methylsulfinyl-ethyl)-methylamino]-4-piperazino-6-methyl-thieno[3,2-d]pyrimidine, m.p. of its dihydrochloride 232°C (decomp.; from isopropanol), of the formula

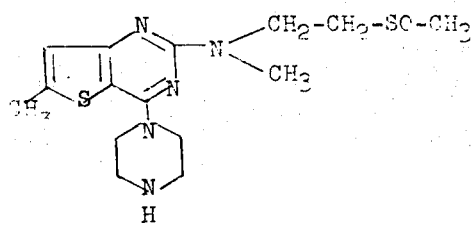

was prepared from 2-chloro-4-(N'-carbethoxy-piperazino)-6-methyl-thieno[3,2-d]pyrimidine (m.p. 167°C) and N-(β-methyl-sulfinyl-ethyl)-methylamine, followed by hydrolysis of the intermediate 2-[N-(β-methylsulfinyl-ethyl)-methylamino[-4-(N'-carbethoxy-piperazino)-6-methyl-thieno[-3,2-d]pyrimidine (m.p. 124°C).

EXAMPLE 34

Using a procedure analogous to that described in Example 25, 2-thiomorpholino-4-piperazino-6-chloro-thieno[3,2-d]pyrimidine, m.p. 194°C (from isopropanol/gasoline), was prepared from 2,6-dichloro-4-(N'-carbethoxy-piperazino)-thieno[3,2-d]pyrimidine (m.p. 178°C) and thiomorpholine, followed by hydrolysis of the intermediate 2-thiomorpholino-4-(N'-carbethoxy-piperazino)-6-chloro-thieno[3,2-d]pyrimidine (m. p. 157°C).

EXAMPLE 35

Using a procedure analogous to that described in Example 25, 2-morpholino-4-piperazino-6-chloro-thieno[3,2-d]pyrimidine, m.p. 178°-179°C, was prepared from 2,6-dichloro-4-(N'-carbethoxy-piperazino)-thieno[3,2-d]pyrimidine (m.p. 178°C) and morpholine, followed by hydrolysis of the intermediate 2-morpholino-4-(N'-carbethoxy-piperazino)-6-chloro-thieno[3,2-d]pyrimidine (m.p. 157°C).

EXAMPLE 36

Using a procedure analogous to that described in Example 25, 2-(thiomorpholino-1'-oxide)-4-piperazino-6-chloro-thieno[3,2-d]pyrimidine, m.p. 260° C (from ethanol/dioxane), was prepared from 2,6-dichloro-4-(N'-carbethoxy-piperazino)-thieno[3,2-d]pyrimidine (m.p. 178°C) and thiomorpholine-1-oxide, followed by hydrolysis of the intermediate 2-thiomorpholino-1'-oxide)-4-N'-carbethoxy-piperazino)-6-chloro-thieno[3,2-d]pyrimidine (m.p. 242°C).

EXAMPLE 37

Using a procedure analogous to that described in Example 25, 2-(thiomorpholine-1', 1'-dioxide)-4-piperazino-6-chloro-thieno[3,2-d]pyrimidine, m.p. 255°-257°C, was prepared from 2,6-dichloro-4-(N'-carbethoxy-piperazino-thieno[3,2-d]pyrimidine (m.p. 178°C) and thiomorpholine-1,1-dioxide, followed by hydrolysis of the intermediate 2-(thiomorpholino-1', 1'-dioxide)-4-(N'-carbethoxy-piperazino)-6-chloro-thieno[3,2-d]pyrimidine (m.p. 248°-250°C).

EXAMPLE 38

Using a procedure analogous to that described in Example 25, 2-morpholino-4-piperazino-7-chloro-thieno[3,2-d]pyrimidine, m.p. 121°-124°C (from ligroin), was prepared from 2,7-dichloro-4-(N'-carbethoxy-piperazino)-thieno[3,2-d]pyrimidine (m.p. 174°-175°C) and morpholine, followed by hydrolysis of the intermediate 2-morpholino-4-(N'-carbethoxy-piperazino)-7-chloro-thieno[3,2-d]pyrimidine (m.p. 193°C).

EXAMPLE 39

Using a procedure analogous to that described in Example 25, 2-thiomorpholino-4-piperazino-7-chloro-thieno[3,2-d]pyrimidine, m.p. 151.5°–152.5°C, was prepared from 2,7-dichloro-4-(N'-carbethoxy-piperazino)-thieno[3,2-d]pyrimidine (m.p. 174°–175°C) and thiomorpholine, followed by hydrolysis of the intermediate 2-thiomorpholino-4-(N'-carbethoxy-piperazino)-7-chloro-thieno[3,2-d]pyrimidine (m.p. 171.5°–172.5°C).

EXAMPLE 40

Using a procedure analogous to that described in Example 25, 2-(thiomorpholino-1'-oxide)-4-piperazino-7-chloro-thieno[3,2-d]pyrimidine, m.p. 237°–238°C (from toluene), was prepared from 2,7-dichloro-4-(N'-carbethoxy-piperazino)-thieno[3,2-d]pyrimidine (m.p. 174°–175°C) and thiomorpholine-1-oxide, followed by hydrolysis of the intermediate 2-(thiomorpholino-1'-oxide)-4-N'-carbethoxy-piperazino)-7-chloro-thieno[3,2-d]pyrimidine (m.p. 197°–199°C).

EXAMPLE 41

Using a procedure analogous to that described in Example 25, 2-(thiomorpholino-1', 1'-dioxide)-4-piperazino-7-chloro-thieno[3,2-d]pyrimidine, m.p. 231°C (from ethanol/dioxane), was prepared from 2,7-dichloro-4-(N'-carbethoxy-piperazino)-thieno[3,2-d]pyrimidine (m.p. 174°–175°C) and thiomorpholine-1,1-dioxide, followed by hydrolysis of the intermediate 2(thiomorpholino-1', 1'-dioxide)-4-(N'-carbethoxy-piperazino)-7-chloro-thieno[3,2-d]pyrimidine (m.p. 232°C).

EXAMPLE 42

Using a procedure analogous to that described in Example 25, 2-thiomorpholino-4-piperazino-7-bromo-thieno[3,2-d]pyrimidine, m.p. of its hydrochloride 314°C (decomp.), of the formula

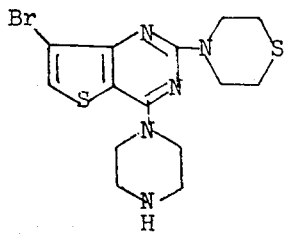

was prepared from 2-chloro-4-(N'-carbethoxy-piperazino)-7-bromo-thieno[3,2-d]pyrimidine (m.p. 216°C) and thiomorpholine, followed by hydrolysis of the intermediate 2-(thiomorpholino)-4-(N'-carbethoxy-piperazino)-7-bromo-thieno[3,2-d]pyrimidine (m.p. 177.5°–178°C).

EXAMPLE 43

Using a procedure analogous to that described in EXample 25, 2-morpholino-4-piperazino-7-bromo-thieno[3,2-d]pyrimidine, m.p. of its hydrochloride semihydrate 307°C (decomp.), was prepared from 2-morpholino-4-(N'-carbethoxy-piperazino)-7-bromo-thieno[3,2-d]pyrimidine (m.p. 216°C) and morpholine, followed by hydrolysis of the intermediate 2-morpholino-4-(N'-carbethoxy-piperazino)-7-bromo-thieno[3,2-d]pyrimidine (m.p. 192°–193°C).

EXAMPLE 44

Using a procedure analogous to that described in Example 25, 2-thiomorpholino-4-piperazino-7-methyl-thieno[3,2-d]pyrimidine, m.p. of its dihydrochloride 305°–310°C (decomp., from isopropanol/water), was prepared from 2-thiomorpholino-4-(N'-carbethoxy-piperazino)-7-methyl-thieno[3,2-d]pyrimidine (m.p. 117°C) and thiomorpholine, followed by hydrolysis of the intermediate 2-thiomorpholino-4-(N'-carbethoxy-piperazino)-7-methyl-thieno[3,2-d]pyrimidine (m.p. 149°C).

EXAMPLE 45

2-Piperazino-4-(thiomorpholino-1', 1'-dioxide)-7-methyl-thieno[3,2-d]pyrimidine and its dihydrochloride 10.6 gm (0.033 mol) of 2-chloro-4-(thiomorpholino-1', 1'-dioxide)-7-methyl-thieno[3,2-d]pyrimidine (m.p. 244°C) were gradually added to 30 gm (0.35 mol) of molten anhydrous piperazine at 140°C, accompanied by stirring, and the mixture was kept at 140°C for 30 minutes more. Thereafter, the reaction mixture was allowed to cool, was then admixed with water, and the aqueous mixture was extracted with methylene chloride. The methylene chloride extract solution was washed with water, dried over sodium sulfate, and the solvent was removed in vacuo. The residue was purified by column chromatography on silicagel (particle size: 0.2–0.5 mm; flow agent: Methanol/ethyl acetate/ammonia = 20:20:1), and the uniform eluate fractions were combined and evaporated. The residue, 2-piperazino-4-(thiomorpholino-1',1'-dioxide)-7-methyl-thieno[3,2-d]pyrimidine, was taken up in ethanol, the resulting solution was acidified with ethanolic hydrochloric acid, and the precipitate formed thereby was collected and recrystallized from ethanol/water, yielding 12 gm (76.3% of theory) of the dihydrochloride dihydrate of the formula

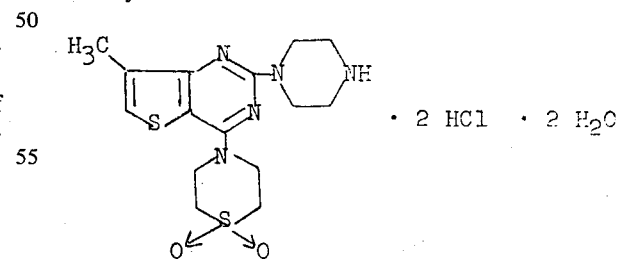

which had a melting point beginning at 200°C.

| Analysis: | $C_{15}H_{21}N_5O_2S_2$ . | 2HCl . 2H$_2$O; mol.wt. 476.47 |
|---|---|---|
| Calculated: | C-37.80%; H-5.71%; | Cl-14.87%; N-14.69%; S-13.45% |
| Found: | C-37.75%; H-5.52%; | Cl-14.79%; N-14.45%; S-13.34% |

EXAMPLE 46

Using a procedure analogous to that described in Example 45, 2-piperazino-4-thiomorpholino-6-methyl-thieno[3,2-d]pyrimidine, m.p. of its dihydrochloride monohydrate beginning at 257°C (from ethanol), was prepared from 2-chloro-4-thiomorpholino-6-methyl-thieno[3,2-d]pyrimidine (m.p. 158°–160°C) and piperazine.

EXAMPLE 47

Using a procedure analogous to that described in Example 45, 2-piperazino-4-(hexahydro-1′, 4′-thiazepino)-thieno[3,2-d]pyrimidine, m.p. 142°C (from ligroin), of the formula

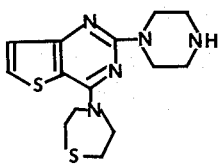

was prepared from 2-chloro-4-(hexahydro-1′, 4′-thiazepino)-thieno[3,2-d]pyrimidine (m.p. 130°C) and piperazine.

EXAMPLE 48

Using a procedure analogous to that described in Example 45, 2-(1′, 4′-diaza-cycloheptano)-4-thiomorpholino-thieno[3,2-d]pyrimidine, m.p. of its dihydrochloride 265°C (from ethanol), was prepared from 2-chloro-4-thiomorpholino-thieno[3,2-d]pyrimidine (m.p. 173°–174°C) and 1,4-diaza-cycloheptane.

EXAMPLE 49

Using a procedure analogous to that described in Example 45, 2-(1′, 4′-diaza-cycloheptano)-4-thiomorpholino-6-methyl-thieno[3,2-d]pyrimidine, m.p. 116°–118°C, m.p. of its dihydrochloride 248°–250°C, of the formula

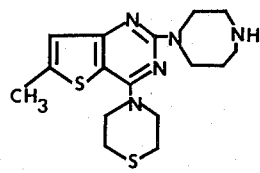

was prepared from 2-chloro-4-thiomorpholino-6-methyl-[3,2-d]pyrimidine (m.p. 158°–160°C) and 1,4-diaza-cycloheptane.

EXAMPLE 50

Using a procedure analogous to that described in Example 45, 2-piperazino-4-thiomorpholino-6-phenyl-thieno[3,2-d]pyrimidine, m.p. of its dihydrochloride semihydrate 260°C (decomp.; from methanol), of the formula

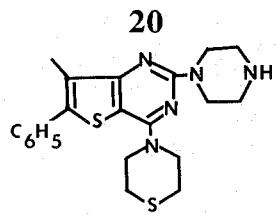

was prepared from 2-chloro-4-thiomorpholino-6-phenyl-thieno[3,2-d]pyrimidine (m.p. 183°–184°C) and piperazine.

EXAMPLE 51

Using a procedure analogous to that described in Example 45, 2-piperazino-4-(2′-methyl-thiomorpholino-1′-oxide)-thieno[3,2-d]pyrimidine, m.p. 124°–126°C (from xylene/petroleum ether), of the formula

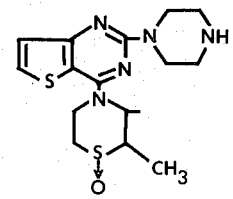

was prepared from 2-chloro-4-(2′-methyl-thiomorpholino-1′-oxide)-thieno[3,2-d]pyrimidine (m.p. 229°–230°C) and piperazine.

EXAMPLE 52

Using a procedure analogous to that described in Example 45, 2-(2′, 5′-dimethyl-piperazino)-4-(thiomorpholino-1′-oxide)-thieno[3,2-d]pyrimidine, m.p. of its dihydrochloride semihydrate 300°–304°C (decomp.; from methanol/acetone), of the formula

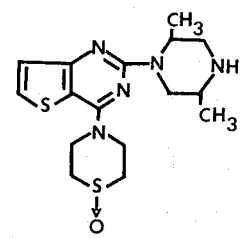

was prepared from 2-chloro-4-(thiomorpholino-1′-oxide)-thieno[3,2-d]pyrimidine (m.p. 233°C) and 2,5-dimethyl-piperazine.

EXAMPLE 53

Using a procedure analogous to that described in Example 45, 2-(1′, 4′-diaza-cycloheptano)-4-(thiomorpholino-1′-oxide)-thieno[3,2-d]pyrimidine, m.p. of its dihydrochloride 315°–318°C (decomp.; from ethanol/water), was prepared from 2-chloro-4-(thiomorpholino-1′-oxide)1thieno[3,2-d]pyrimidine (m.p. 233°C) and 1,4-diaza-cycloheptane.

EXAMPLE 54

Using a procedure analogous to that described in Example 45, 2-piperazino-4-(hexahydro-1′, 4′- thiazepino-1'-oxide)-thieno[3,2-d]pyrimidine, m.p. of its dihydrochloride monohydrate 268°–270°C (decomp.; from isopropanol/water), of the formula

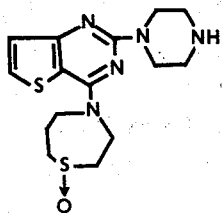

was prepared from 2-chloro-4-(hexahydro-1', 4'-thiazepino-1'-oxide)-thieno[3,2-d]pyrimidine (m.p. 190°C) and piperazine.

EXAMPLE 55

Using a procedure analogous to that described in Example 45, 2-piperazino-4-(thiomorpholino-1'-oxide)-6-methyl thieno[3,2-d]pyrimidine, m.p. of its dihydrochloride dihydrate beginninng at 235°C (from isopropanol/water), was prepared from 2-chloro-4-(thiomorpholino-1'-oxide)-6-methyl-thieno[3,2-d]pyrimidine (m.p. 228°C) and piperazine.

EXAMPLE 56

Using a procedure analogous to that described in Example 45, 2-piperazino-4-(thiomorpholino-1'-oxide)-6,7-dimethyl-thieno[3,2-d]pyrimidine, m.p. of its dihydrochloride monohydrate 270°C (decomp.), of the formula

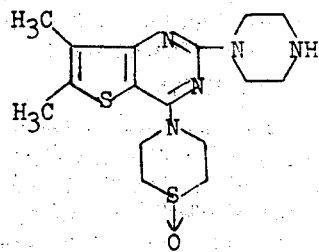

was prepared from 2-chloro-4-(thiomorpholino-1'-oxide)-6.7-dimethyl-thieno[3,2-d]pyrimidine and piperazine.

EXAMPLE 57

Using a procedure analogous to that described in Example 45, 4-[N-($\beta$-methylmercapto-ethyl)-methylamino]-2-piperazino-thieno[3,2-d]pyrimidine, m.p. of its dihydrochloride semihydrate 265°–266°C (from isopropanol/water), was prepared from 2-chloro-4-[N-($\beta$-methylmercapto-ethyl)-methylamino]-thieno[3,2-d]pyrimidine (m.p. 108°–109°C) and piperazine.

EXAMPLE 58

Using a procedure analogous to that described in Example 45, 2-piperazino-4-[N-($\beta$-methylsulfinyl-ethyl)-methylamino]-thieno[3,2-d]pyrimidine, m.p. of its dihydrochloride dihydrate 246°C (decomp.), was prepared from 2-chloro-4-[N-($\beta$-methylsulfinyl-ethyl)-methylamino]-thieno[3,2-d]pyrimidine (m.p. 169°C) and piperazine.

EXAMPLE 59

Using a procedure analogous to that described in Example 45, 2-piperazino-4-thiomopholino-7-methyl-thieno[3,2-d]pyrimidine, m.p. 126°–127°C (from petroleum ether 50°–70°C), was prepared from 2-chloro-4-thiomorpholino-7-methyl-thieno[3,2-d]pyrimidine (m.p. 103°–104°C) and piperazine.

EXAMPLE 60

Using a procedure analogous to that described in Example 45, 2-(thiomorpholino-1'-oxide)-4-(N'-methyl-piperazino)-thieno[3,2-d]pyrimidine, m.p. 177°–179°C, was prepared from 2-chloro-4-(N'-methyl-piperazino)-thieno[3,2-d]pyrimidine (m.p. 117°–118°C) and thiomorpholine-1-oxide.

EXAMPLE 61

Using a procedure analogous to that described in Example 45, 2-(N'-methyl-piperazino)-4-thiomorpholino-6-methyl-thieno[3,2-d]pyrimidine, m.p. of its dihydrochloride 300°–302°C, was prepared from 2-chloro-4-thiomorpholino-6-methyl-thieno[3,2-d]pyrimidine (m.p. 158°–160°C) and N-methyl-piperazine.

EXAMPLE 62

2-Piperazino-4-(thiomorpholino-1',1'-dioxide)-thieno[3,2-d]pyrimidine and its dihydrochloride A mixture consisting of 9.1 gm (0.03 mol) of 2-chloro-4-(thiomorpholino-1',1'-dioxide)-thieno[3,2-d]pyrimidine (m.p. 264°C) and 20 gm (0.232 mol) of anhydrous piperazine was heated at 130° to 140°C, accompanied by stirring, until a clear molten mass was formed, which occurred after about 30 minutes. The reaction mixture was then allowed to cool, was taken up in methylene chloride, and the resulting solution was washed several times with water, dried over sodium sulfate and evaporated in vacuo. The residue, the raw free base 2-piperazino-4-(thiomorpholino-1',1'-dioxide)-thieno[3,2-d]pyrimidine, was stirred with ethanol, the insoluble matter was filtered off, and the filtrate was acidified with ethanolic hydrochloric acid. The precipitate formed thereby was collected by vacuum filtration and recrystallized from methanol/water, yielding 11.8 gm (92.3% of theory) of the dihydrochloride of the formula which had a melting point of 270°C (decomp.).

Analysis: $C_{14}H_{19}N_5O_2S_2$ . 2 HCl; mol.wt. 426.20
Calculated: C-39.45%; H-4.96%; Cl-16.62%; S-15.03%

EXAMPLE 63

Using a procedure analogous to that described in Example 62, 2-piperazino-4-(thiomorpholino-1'-oxide)-thieno [3,2-d]pyrimidine, m.p. 166°–168°C (from isopropanol), m.p. of its dihydrochloride monohydrate 303°–305°C (decomp.; from ethanol/water), was prepared from 2-chloro-4-(thiomorpholino-1'-oxide)-thieno[3,2-d]pyrimidine (m.p. 233°C) and piperazine.

EXAMPLE 64

Using a procedure analogous to that described in Example 62, 2-piperazino-4-thiomorpholino-thieno[3,2-d]pyrimidine, m.p. 154°–155°C (from ethyl acetate/petroleum ether = 5:1), was prepared from 2-chloro-4-thiomorpholino-thieno[3,2-d]pyrimidine (m.p. 173°–174°C) and piperazine.

EXAMPLE 65

Using a procedure analogous to that described in Example 62, 2-piperazino-4-thiomorpholino-6,7-dimethyl-thieno[3,2-d]pyrimidine, m.p. 123°–125°C (from acetone) was prepared from 2-chloro4-thiomorpholino-6,7-dimethyl-thieno[3,2-d] pyrimidine (m.p. 128°C) and piperazine.

EXAMPLE 66

Using a procedure analogous to that described in Example 62, 2-piperazino-4-(2'-methyl-thiomorpholino)-thieno [3,2-d]pyrimidine, m.p. of its dihydrochloride 263°–266°C (from ethanol/acetone), was prepared from 2-chloro-4-(2'-methyl-thiomorpholino)-thieno[3,2-d]pyrimidine m.p. 157°–158°C) and piperazine.

EXAMPLE 67

Using a procedure analogous to that described in Example 62, 2-piperazino-4-(thiomorpholino-1'-oxide)-6-phenyl-thieno[3,2-d]-pyrimidine, m.p. 198°–200°C (from isopropanol), was prepared from 2-chloro-4-thiomorpholino-1'-oxide)-6-phenyl-thieno[3,2-d]pyrimidine, m.p. 198°–200°C (from isopropanol), was prepared from 2-chloro-4-(thiomorpholino-1'-oxide)-6-phenyl-thieno[3,2-d]pyrimidine (m.p. 137°–138.5°C) and piperazine.

EXAMPLE 68

Using a procedure analogous to that described in Example 62, 2,4-di-(thiomorpholino-1'-oxide)-thieno[3,2-d]pyrimidine, m.p. 230°–231°C (from ethanol/ether), was prepared from 2-chloro-4-(thiomorpholino-1'-oxide)-thieno[3,2-d]pyrimidine (m.p. 233°C) and thiomorpholino-1-oxide.

EXAMPlE 69

Using a procedure analogous to that described in Example 62, 2-piperazino-4-(thiomorpholino-1'-oxide)-7-methyl-thieno[3,2-d]pyrimidine, m.p. 228°–230°C (from dioxane), m.p. of its dihydrochloride semihydrate 243°C (decomp.; from ethanol) was prepared from 2-chloro-4-(thiomorpholino-1'-oxide)-7-methyl-thieno[3,2-d]pyrimidine (m.p. 239°C) and piperazine.

The sulfate dihydrate, m.p. beginning at 170°C (from ethanol/water), was obtained by admixing a methanolic solution of the free base with an equivalent amount of sulfuric acid.

The maleate, m.p. 188°C, was obtained in like manner with maleic acid.

EXAMPLE 70

Using a procedure analogous to that described in Example 62, 2-(N'-methyl-piperazino)-4-(thiomorpholino-1'-oxide)-thieno[3,2-d]pyrimidine, m.p. of its dihydrochloride monohydrate 305°C (decomp.), was prepared from 2-chloro-4-thiomorpholino-1'-oxide)-thieno[3,2-d]pyrimidine (m.p. 233°C) and N-methyl-piperazine.

EXAMPLE 71

Using a procedure analogous to that described in Example 62, 2-(N'-benzyl-piperazino)-4-(thiomorpholino-1'-oxide)-7-methyl-thieno[3,2-d]pyrimidine, m.p. 179°C (from isopropanol) of the formula

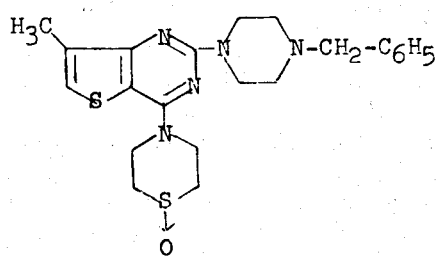

was prepared from 2-chloro-4-(thiomorpholino-1'-oxide)-7-methyl-thieno[3,2-d]pyrimidine (m.p. 239°C) and N-benzylpiperazine.

EXAMPLE 72

Using a procedure analogous to that described in Example 62, 2-[N'-(β-hydroxy-ethyl)-piperazino]-4-(thiomorpholino-1'-oxide)-thieno[3,2-d]pyrimidine, m.p. 120°–122°C (from water) of the formula

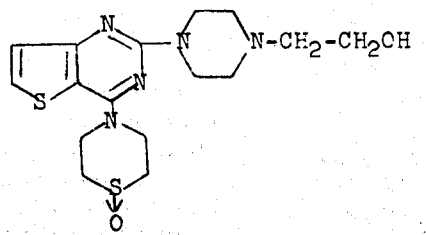

was prepared from 2-chloro-4-(thiomorpholino-1'-oxide)-thieno[3,2-d]pyrimidine (m.p. 233°C) and N-(β-hydroxy-ethyl)-piperazine.

EXAMPLE 73

Using a procedure analogous to that described in Example 62, 2-diethanolamino-4-(thiomorpholino-1'-oxide)-7-methyl-thieno[3,2-d]pyrimidine, m.p. 148°–150°C (from ethyl acetate) of the formula

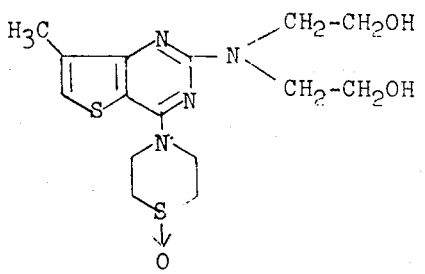

was prepared from 2-chloro-4-(thiomorpholino-1'-oxide)-7-methyl-thieno[3,2]pyrimidine (m.p. 239°C) and diethanolamine.

EXAMPLE 74

Using a procedure analogous to that described in Example 62, 2-(N'-methyl-piperazino)-4-(thiomorpholino-1'-oxide)-7-methyl-thieno[3,2-d]pyrimidine, m.p. 213°C (from isopropanol/water), was prepared from 2-chloro-4-(thiomorpholino-1'-oxide)-7-methyl-thieno[3,2-d]pyrimidine (m.p. 239°C) and N-methyl-piperazine.

EXAMPLE 75

Using a procedure analogous to that described in Example 62, 2-(N'-methyl-piperazino)-4-(thiomorpholino-1',1'-dioxide)-7-methyl-thieno[3,2-d]pyrimidine, m.p. 178°C (from isopropanol), was prepared from 2-chloro-4-(thiomorpholino-1',1'-dioxide)-7-methyl-thieno[3,2-d]pyrimidine (m.p. 244°C) and N-methyl-piperazine.

EXAMPLE 76

Using a procedure analogous to that described in Example 62, 2,4di-thiomorpholino-thieno[3,2-d]pyrimidine, m.p. 137°–139°C (from ethanol) was prepared from 2-chloro-4-thiomorpholino-thieno[3,2-d]pyrimidine (m.p. 173°–174°C) and thiomorpholine.

The point of attachment of the substituent $R_3$ or $R_4$, when it was chlorine, bromine or nitro in the 6- or 7-position in the above compounds of the formula I, was ascertained by means of nuclear resonance spectra and in analogy to M. Robba et al. Bull. Soc. Chim. France 1970, 3630–3636, and Tetrahedron 27, 487–499 (1971).

The compounds according to the present invention, that is, those embraced by formula I and their non-toxic, pharmacologically acceptable acid addition salts, have useful pharmacodynamic properties. More particularly, the compounds of the instant invention exhibit a very strong inhibiting action upon thrombocyte aggregration and adhesiveness (platelet stickiness), as well as hypotensive activities, in -warm-blooded animals, such as mice, cats and dogs. The hypotensive activity is particularly pronounced in those compounds of the formula I whereinn $R_1$ and/or $R_2$ are thiomorpholine-1-oxide.

For instance, intrevenous administration of 0.1 mgm/kg of 7-chloro-2-piperazino-4-(thiomorpholino-1'-oxide)- thieno[3,2-d]pyrimidine to anesthetized cats produced a 25% reduction in the blood pressure over the normal value, and the hypotensive effect lasted for more than 60 minutes.

The inhibiting action upon thrombocyte aggregation was ascertained by the method of Born and Cross, J. Physiol. 170, 387 (1964), or by the method of K. Bredin, Schweiz. Med. Wochenschr. 95, 655–660 (1965).

The inhibiting effect upon the platelet stickiness was determined by means of the so-called retention test according to Morris [see E. Deutsch et al., 1. Internationales Symposium Ueber Stoffwechsel and Membranpermeabilitaet von Erythrocyten and Thrombocyten, Vienna, Austria (1969); Georg Thieme Verlag, Stuttgart, Germany].

The hypotensive tests were performed on anesthetized cats and dogs by the method of Eckenhoff, Amer. J. Physiol. 148, 582 (1947).

The table below shows the results obtained from the tests for thromboctye aggregation inhibition according to the method of Morris and the method of Born and Cross for a number of representative compounds according to the present invention, namely;

A = 2-Piperazino-4-(thiomorpholino-1'-oxide)-7-methyl-thieno [3,2-d]pyrimidine dihydrochloride,
B = 2-piperazino-4-(thiomorpholino-1'-oxide)-thieno[3,2-d]pyrimidine dihydrochloride,
C = 2-piperazino-4-(thiomorpholino-1'-oxide)-6-methyl-thieno [3,2d]pyrimidine dihydrochloride,
D = 4-piperazino-2-(thiomorpholino-1'-oxide)-6-methyl-thieno [3,2-d]pyrimidine dihydrochloride,
E = 4-piperazino-2-(thiomorpholino-1'-oxide)-thieno[3,2-d]pyrimidine dihydrochloride,
F = 2-piperazino-4-thiomorpholino-7-methyl-thieno[3,2-d]pyrimidine dihydrochloride,
G = 2-piperazino-4-thiomorpholino-thieno[3,2-d]pyrimidine dihydrochloride,
H = 7-bromo-2-piperazino-4-(thiomorpholino-1'-oxide)-thieno [3,2-d]pyrimidine dihydrochloride,
I = 7-chloro-2-piperazino-4-(thiomorpholino-1'-oxide)-thieno [3,2-d]pyrimidine dihydrochloride,
J = 6-chloro-2-piperazino-4-(thiomorpholino-1'-oxide)-thieno [3,2-d]pyrimidine dihydrochloride, and
K = 7-bromo-4morpholino-2-piperazino-thieno[3,2-d]pyrimidine dihydrochloride.

1. Determination of platelet aggregation according to Morris

To determine the inhibiting action of the test compound upon thrombocyte aggregation, 1 ml of human blood is pipetted into small test tubes, and the test compound is added to a final concentration of $5\times10^{-5}$ mol/liter resp. $1\times10^{-5}$ mol/liter. The tubes are incubated for 10 minutes at 37°C. 1 gm of glass beads (glass beads for gas-chromatography) is added to half of the tubes. Finally the closed tubes are attached to a vertical wheel and rotated for 1 minute. By this means good contact is obtained between the glass beads and the blood. The tubes are then allowed to stand at room temperature for another hour, after which time a satisfactory sedimentation of erythrocytes has taken place. 0.01 ml of the supernatant plasma is removed, diluted to 1:8,000 with celloscope solution, and the platelet count is read in the celloscope. The percent reduction in the stickiness due to the presence of the substance (compared to tubes without glass beads) is measured and the average of four to six determinations is taken.

2. Determination of platelet aggregation according to Born and Cross

The platelet aggregation was measured in human, platelet-rich plasma taken from healthy donors. The rate of decline of the optical density of the platelet suspension was measured and registered photometrically after adenosinediphosphate (ADP) had been added. From the slope of the density curve the rate of the aggregation was estimated. The optical density was taken as the point on the curve where most light was transmitted.

The smallest possible doses of ADP were chosen, but enough to give irreversible aggregation. Before ADP was added the plasma was incubated at 37°C for ten minutes with varying quantities of the compound.

In the table the reduction in the rate of aggregation and the diminution of light transmission of the platelet-rich plasma are given. The numbers represent percentage change in comparison to the same plasma without the test compounds. The indicated numbers in each case are average values of two single tests. The first number indicates the rate of aggregation, and the second number the optical density.

3. The acute toxicity of some of the compounds for orientation (observation time: 14 days) was determined on mice, or the $LD_{50}$ was calculated from the percentage of animals which died after different doses within the observation time [see J. Pharmacol. exper. Therap. 96, 99 (1949)].

TABLE

| Compound | Morris-test molar-concentration | | Born-test molar concentration | | $LD_{50}$ p.o. |
|---|---|---|---|---|---|
| | $5\times10^{-5}$ | $1\times10^{-5}$ | $3\times10^{-5}$ | $1\times10^{-5}$ | (mouse) |
| A | 75% | 26% | 65/82 | 25/28 | 290 mg/kg |
| B | 93% | 76% | 100/100 | 100/100 | 472 mg/kg |
| C | 97% | 83% | 100/100 | 100/100 | 1070 mg/kg |
| D | 87% | 54% | 100/100 | 100/100 | >250 mg/kg |
| E | 100% | 86% | 100/100 | 96/98 | — |
| F | 94% | 67% | 55/85 | 48/49 | — |
| G | 100% | 85% | 96/98 | 72/92 | 450 mg/kg |
| H | 93% | 91% | 100/100 | 100/100 | ~350 mg/kg |
| I | 96% | 91% | — | 100/100 | >250 mg/kg |
| J | 92% | 91% | 100/100 | 100/100 | >150 mg/kg |
| K | 96% | 80% | 100/100 | 82/92 | — |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solution, suspensions, emulsions, syrups, suppositories and the like. One effective dosage unit of the compounds according to the present invention is from 0.083 to 1.67 mgm/kg body weight, preferably 0.16 to 0.84 mgm/kg body weight. The daily dose rate is from 1.66 to 3.34 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 77

Tablets

The tablet composition is compounded from the following ingredients:

| | |
|---|---|
| 2-Piperazino-4-(thiomorpholino-1'-oxide)-7-methyl-thieno[3,2-d]pyrimidine | 30.0 parts |
| Lactose | 38.0 parts |
| Potato starch | 26.0 parts |
| Polyvinylpyrrolidone | 5.0 parts |
| Magnesium stearate | 1.0 parts |
| Total | 100.0 parts |

Preparation

The thienopyrimidine compound is intimately admixed with the lactose and the potato starch, the mixture is uniformly moistened with an ethanolic 20% solution of the polyvinylpyrrolidone, the moist mass is forced through a 1.5 mm-mesh screen, and the resulting granulate is dried at 45°C and again passed through a 1.0 mm-mesh screen. The dry granulate thus obtained is admixed with the magnesium stearate, and the composition is compressed into 100 mgm-tablets in a conventional tablet making machine. Each tablet contains 30 mgm of the thienopyrimidine compound and is an oral dosage unit composition with effective thrombocyte aggregation and stickiness inhibiting action.

EXAMPLE 78

Coated pills

The pill core composition is compounded from the following ingredients:

| | |
|---|---|
| 7-Methyl-2-piperazino-4-(1'-oxido-thiomorpholino)-thieno[3,2-d]pyrimidine | 15.0 parts |
| Lactose | 14.0 parts |
| Corn starch | 8.0 parts |
| Polyvinylpyrrolidone | 2.5 parts |
| Magnesium stearate | 0.5 parts |
| Total | 40.0 parts |

Preparation

The ingredients are compounded in a manner analogous to that described in the preceding example, and the composition is compressed into 40 mgm-pill cores, which are subsequently coated with a thin shell consisting essentially of a mixture of talcum and sugar and finally polished with beeswax. Each coated pill contains 15 mgm of the thienopyrimidine compound and is an oral dosage unit composition with effective thrombocyte aggregation and stickiness inhibiting action.

EXAMPLE 79

Hypodermic Solution

The solution is compounded from the following ingredients:

| | |
|---|---|
| 7-Methyl-2-piperazino-4-(1'-oxido-thiomorpholino)-thieno[3,2-d]pyrimidine | 10.0 parts |
| Polyethyleneglycol 600 | 100.0 parts |
| Distilled water    q.s.ad. | 2000.0 parts by vol. |

29
Preparation

The polyethyleneglycol and the pyridopyrimidine salt are dissolved in a sufficient amount of distilled water which had previously been boiled and cooled in an atmosphere of nitrogen; the dissolution is also carried out in an atmosphere of nitrogen. The resulting solution is diluted to the indicated volume with additional pre-treated distilled water, and the resulting solution is filled, again in an atmosphere of nitrogen, into brown 2 cc-ampules which are then sterilized for 20 minutes at 120°C and subsequently sealed. The entire operation must be performed in diffused light. Each ampule contains 10 mgm of the thienopyrimidine compound, and the contents thereof are an injectable dosage unit composition with effective thrombocyte aggregation and stickiness inhibiting action.

EXAMPLE 80
Drop Solution

The solution is compounded from the following ingredients:

| | |
|---|---|
| 2-Piperazino-4-morpholino-thieno [3,2-d]pyrimidine . 2 HCl | 10.0 parts |
| Cane sugar | 350.0 parts |
| Sorbic acid | 1.0 parts |
| Essence of cocoa | 50.0 parts |
| Ethyl alcohol | 200.0 parts by vol. |
| Polyethyleneglycol 600 | 100.0 part by vol. |
| Distilled water q.s.ad. | 1000.0 part by vol. |

Preparation

The sorbic acid is dissolved in the ethanol, the solution is diluted with an equal volume of distilled water, and the thienopyrimidine compound is dissolved in the aqueous mixture (solution 1). The cane sugar is dissolved in the remaining amount of distilled water (solution 2). Solution 2, the polyethyleneglycol and the essence of cocoa are stirred into solution 1, and the composition is filtered. The entire operation must be performed in an atmosphere of nitrogen and in diffused light. 1 ml of the filtrate (about 20 drops) contains about 10 mgm of the thienopyrimidine compound and is an oral dosage unit composition with effective thrombocyte aggregation and stickiness inhibiting action.

Analogous results are obtained when any one of the other thienopyrimidines embraced by formula I or a non-toxic acid addition salt thereof is substituted for the particular thienopyrimidine in Examples 77 through 80. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

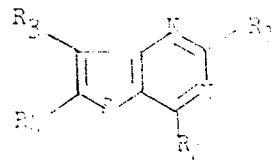

wherein:
one of $R_1$ and $R_2$ is piperazino, N''-methyl-piperazino, N'-benzyl-piperazino, N'-($\beta$-hydroxyethyl)-piperazino, dimethyl-piperazino or 1-oxido-thiomorpholino,
the other of $R_1$ and $R_2$ is 1-oxido-thiomorpholino, 1,1-dioxido-thiomorpholino or 2-methyl-1-oxido-thiomorpholino,
provided, however, that $R_1$ and $R_2$ are other than 1-oxido-thiomorpholino and 1,1-dioxido-thiomorpholino or 2-methyl-1-oxido-thiomorpholino, respectively, at the same time,
one of $R_3$ and $R_4$ is hydrogen or methyl,
and the other of $R_3$ and $R_4$ is hydrogen, methyl, chlorine, bromine or nitro,
or a non-toxic, pharmacologically acceptable acid addition salt thereof.

2. A compound according to claim 1, which is 2-piperazino-4-(thiomorpholino-1'-oxide)-7-methyl-thieno[3,2-d]pyrimidine or a non-toxic, pharmacologically acceptable acid addition salt thereof.

3. A compound according to claim 1, which is 2-piperazino-4-(thiomorpholino-1'-oxide)-thieno[3,2-d]pyrimidine or a non-toxic, pharmacologically acceptable acid addition salt thereof.

4. A compound according to claim 1, which is 2-piperazino-4-(thiomorpholino-1'-oxide)-6-methyl-thieno[3,2-d]pyrimidine or a non-toxic, pharmacologically acceptable acid addition salt thereof.

5. A compound according to claim 1, which is 4-piperazino-2-(thiomorpholino-1'-oxide)-6-methyl-thieno[3,2-d]pyrimidine or a non-toxic, pharmacologically acceptable acid addition salt thereof.

6. A compound according to claim 1, which is 4-piperazino-2-(thiomorpholino-1'-oxide)-thieno[3,2-d]pyrimidine or a non-toxic, pharmacologically acceptable acid addition salt thereof.

7. A compound according to claim 1, which is 7-bromo-2-piperazino-4-(thiomorpholino-1'-oxide)-thieno[3,2-d]pyrimidine or a non-toxic, pharmacologically acceptable acid addition salt thereof.

8. A compound according to claim 1, which is 7-chloro-2-piperazino-4-(thiomorpholino-1'-oxide)-thieno[3,2-d]pyrimidine or a non-toxic, pharmacologically acceptable acid addition salt thereof.

9. A compound according to claim 1, which is 6-chloro-2-piperazino-4-(thiomorpholino-1-oxide)-thieno[3,2-d]pyrimidine or a non-toxic, pharmacologically acceptable acid addition salt thereof.

* * * * *

PO-1050
(5/69)

UNITED STATES PATENT OFFICE
CERTIFICATE OF CORRECTION

Patent No. 3,888,853        Dated June 10, 1975

Inventor(s) REINHOLD KNOLL, JOSEF KOCH, ERICH MÜLLER and JOSEF NICKL

It is certified that error appears in the above-identified patent and that said Letters Patent are hereby corrected as shown below:

| Col. | Line | |
|---|---|---|
| 3 | 22 | "-diahalo-" should read -- -dihalo- -- |
| 5 | 2 | "C-30.50%" should read -- C-30.05% -- |
| 13 | 47 | "-piperazine-" should read -- -piperazino- -- |
| 15 | 30 | "-methylamino[" should read -- -methylamino] -- |
| 22 | 57 | After "calculated", please insert -- Found: C-39.20%; H-5.23%; C-16.45%; S-14.95% -- |
| 23 | 30 | "intrevenous" should read -- intravenous -- |

Signed and Sealed this twenty-first Day of October 1975

[SEAL]

Attest:

RUTH C. MASON
Attesting Officer

C. MARSHALL DANN
Commissioner of Patents and Trademarks